S. G. MONCE.
GLASS CUTTER.
APPLICATION FILED JULY 28, 1916.
1,232,366.
Patented July 3, 1917.
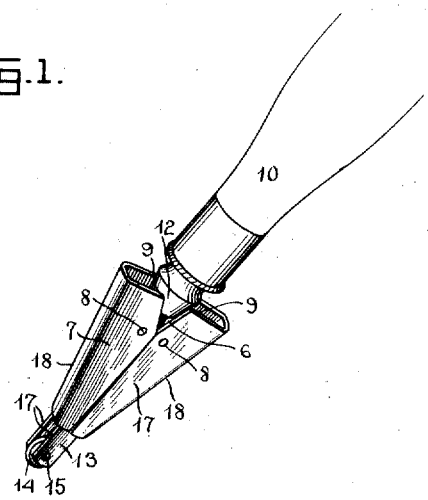
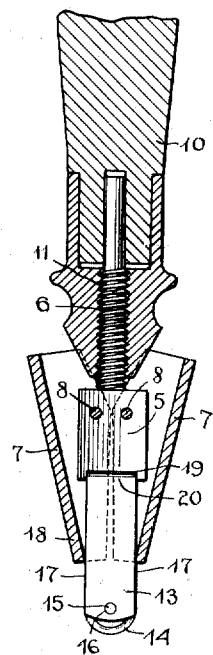
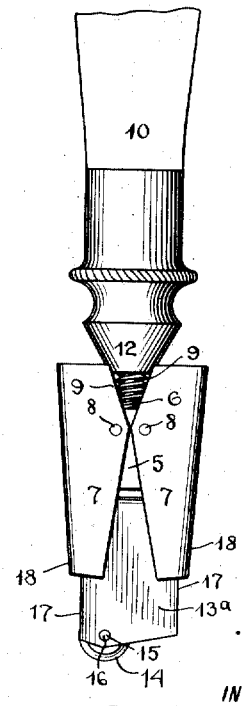
WITNESSES
INVENTOR
Samuel G. Monce
BY
ATTORNEYS

UNITED STATES PATENT OFFICE.

SAMUEL G. MONCE, OF UNIONVILLE, CONNECTICUT.

GLASS-CUTTER.

1,232,366.      Specification of Letters Patent.      Patented July 3, 1917.

Application filed July 28, 1916. Serial No. 111,825.

*To all whom it may concern:*

Be it known that I, SAMUEL G. MONCE, a citizen of the United States, and a resident of Unionville, in the county of Hartford and State of Connecticut, have invented a new and Improved Glass-Cutter, of which the following is a full, clear, and exact description.

My invention has for its object to provide a glass cutter very simple in construction, the body of the cutter having clamping members operable by a movement of the handle relatively thereto to secure a detachable mounting on which the glass cutting wheel is rotatably mounted.

Additional objects of the invention will appear in the following specification, in which the preferred form of the invention is disclosed.

In the drawings, similar reference characters denote similar parts in all the views, in which—

Figure 1 is a perspective view illustrating my invention;

Fig. 2 is an enlarged sectional elevation of the invention; and

Fig. 3 is an enlarged side elevation of the invention showing the device with the clamping members holding in position another form of mounting which carries a glass cutting wheel.

In glass cutting, it is necessary to select a glass cutting wheel with reference to the hardness of the glass, and it is also advantageous to use different mountings for the glass cutting wheels when cutting glass under different conditions. In view of this, and also in view of the fact that the glass cutting wheels wear with use, it is important that a simple and inexpensive glass cutting wheel with its mounting be provided, and that this mounting be detachably secured to a handle, so that it may be replaced when desired. With the glass cutter which I will now describe, any desired glass cutting wheel, with any desired mounting, may be made use of, and the mounting with the glass cutting wheel may be readily secured by the clamping members to the handle after selection.

By referring to the drawings, it will be seen that the device is provided with a body 5 having a screw 6 which is secured to the body and projects therefrom, there being pivoted at each side of the body clamping members 7 7, which are U-shaped in cross-section, pins 8 being the means by which the clamping members 7 are pivoted to the body 5. Each of the clamping members 7 has two sets of edges 9, the edges 9 on each of the clamping members 7 diverging from the body 5 relatively to the edges 9 on the other clamping member 7. The screw 6 is disposed between these edges 9, so that when a handle 10 which has a threaded opening 11 in which the screw 6 meshes, is turned relatively to the screw 6, the downwardly converging edges 12 of the handle will engage the edges 9 of the clamping members 7 to press outwardly the upper portions of the clamping members 7 and their lower portions in the direction of each other to embrace the mounting 13.

This mounting 13 is elongated and is U-shaped. A glass cutting wheel 14 is rotatably mounted on a pin or arbor 15 which is secured to the sides of the mounting 13 at bearings 16. The mounting 13 is disposed between the clamping members 7 so that its edges 17 will be engaged by the central portions 18 of the clamping members 7. When a large mounting 13$^a$ is used, the lower ends of the clamping members 7 will be moved sufficiently far from each other for the central portions 18 of the clamping members to engage the edges of the mounting 13$^a$ for a considerable distance, and thereby obtain a firm hold; but when a small mounting 13 is used, such as the one illustrated in Fig. 2 of the drawings, I provide the body 5 with a recess 19 in which I dispose the end 20 connecting the arms of the mounting 13. This prevents the movement of the said ends after the mounting 13 has been firmly embraced by the central portions 18 of the clamping members 7.

Having thus described my invention, I claim as new and desire to secure by Letters Patent:

1. In a glass cutter, a body having an end with a recess, a clamping member secured to the body, a companion clamping member pivoted to the body, a screw secured to and projecting from the other end of the body, a handle having a thread meshing with the screw and a portion for engaging the pivoted clamping member, a mounting disposed between the clamping members with an end disposed in the recess in the body, and a glass cutting wheel rotatably mounted on the mounting.

2. In a glass cutter, a body having an end with a recess, a clamping member secured to the body, a companion clamping member pivoted to the body, a screw secured to and projecting from the other side of the body, a handle having a thread meshing with the screw and a portion for engaging the pivoted clamping member, an elongated U-shaped member having bearings adjacent its free terminals, an arbor secured in the bearings, a glass cutting wheel rotatably mounted on the arbor and projecting beyond the terminals of the U-shaped member, the said U-shaped member at its central portion being disposed in the recess with the edges of the U-shaped member embraced by the clamping members, for the purpose specified.

3. In a glass cutter, a body having an end, a clamping member secured to the body, a companion clamping member pivoted to the body, a screw secured to and projecting from the other end of the body, a handle having a thread meshing with the screw and a portion for engaging the pivoted clamping member, an elongated U-shaped member having bearings adjacent its free terminals, an arbor secured in the bearings, a glass cutting wheel mounted on the arbor and projecting beyond the terminals of the U-shaped member, the said U-shaped member at its central portion being disposed against the first mentioned end of the body with the edges of the U-shaped member embraced by the clamping members for the purpose specified.

SAMUEL G. MONCE.

Copies of this patent may be obtained for five cents each, by addressing the "Commissioner of Patents, Washington, D. C."